May 31, 1927.

G. A. HOFFMAN 1,630,940

ELECTRIC PREHEATER FOR VAPOR BURNERS

Filed Nov. 18, 1926

Witness

Inventor
G. A. Hoffman,
By H. B. Willson & Co.
Attorneys

May 31, 1927.　　　　　G. A. HOFFMAN　　　　　1,630,940
ELECTRIC PREHEATER FOR VAPOR BURNERS
Filed Nov. 18, 1926　　　　2 Sheets-Sheet 2
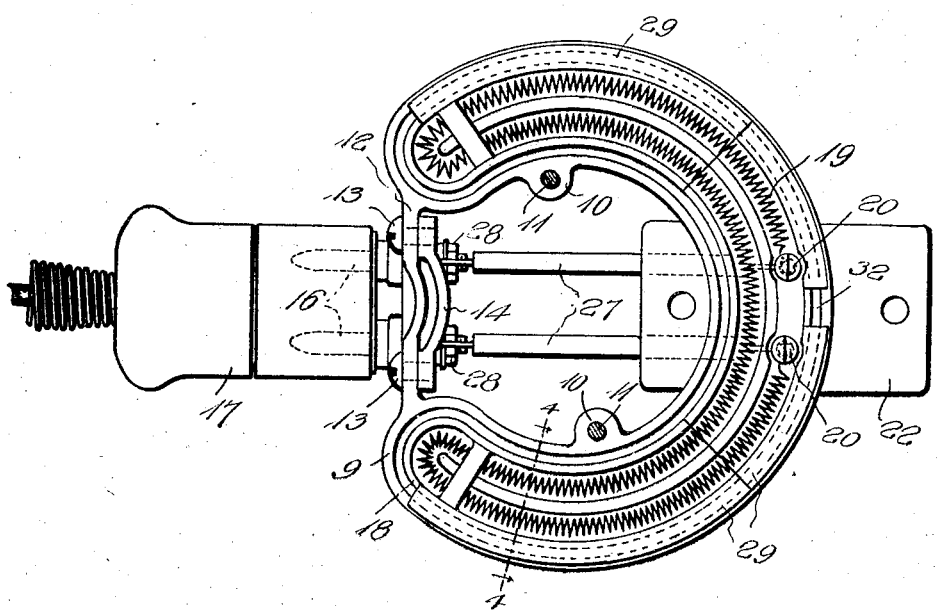
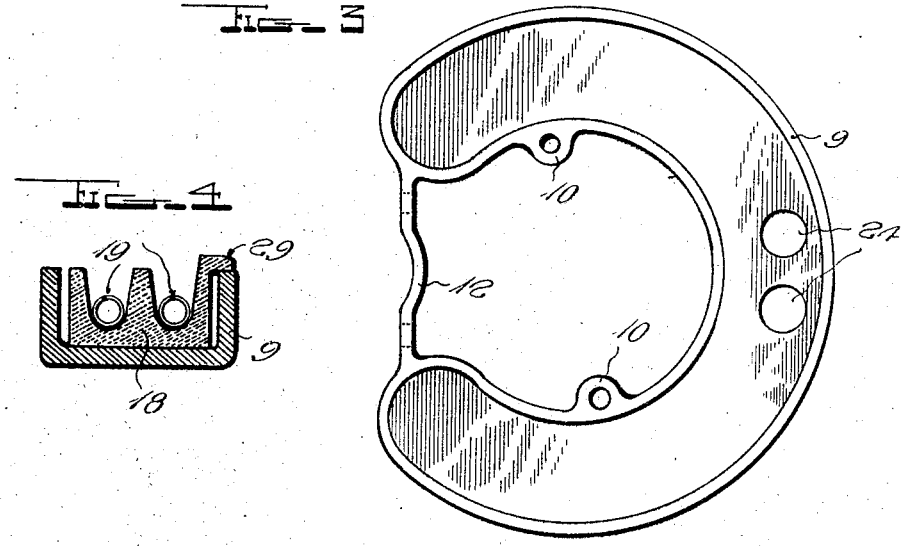
Inventor
G. A. Hoffman,
Attorneys Patented May 31, 1927.

1,630,940

UNITED STATES PATENT OFFICE.

GEORGE ALBERT HOFFMAN, OF MANSFIELD, OHIO, ASSIGNOR TO THE NEW METHOD STOVE COMPANY, OF MANSFIELD, OHIO.

ELECTRIC PREHEATER FOR VAPOR BURNERS.

Application filed November 18, 1926. Serial No. 149,210.

Burners which vaporize liquid fuel and consume the vapor, are commonly provided with troughs or the like, in which a quantity of gasoline, alcohol or the like, is burned to pre-heat the burner, so that vaporization of the oil will take place when the supply is turned on. Not only is such priming and pre-heating rather troublesome, but when children or servants have access to the burners and to the pre-heating fuel, there is a dangerous fire hazard. It is the aim of the present invention however, to provide new and improved electrical means for pre-heating the fuel troughs, so that the necessity of priming and initially heating with liquid fuel, is obviated.

It is a further aim of the invention to improve upon the construction shown in my U. S. Patent No. 1,597,651 of August 24, 1926, by including with the structure shown by this patent, an electric pre-heater having a novel relation with the features of construction previously employed.

With the foregoing in view, the invention resides in the novel subject matter hereinafter described and claimed, the description being supplemented by the accompanying drawings.

Fig. 2 is a top plan view of the electrical pre-heater.

Fig. 3 is a top plan view of the auxiliary trough which contains the electrical heating means and is mounted directly under the fuel vaporizing trough of the burner structure.

Fig. 4 is a detail vertical transverse section on the correspondingly numbered line of Fig. 2.

Figure 1:
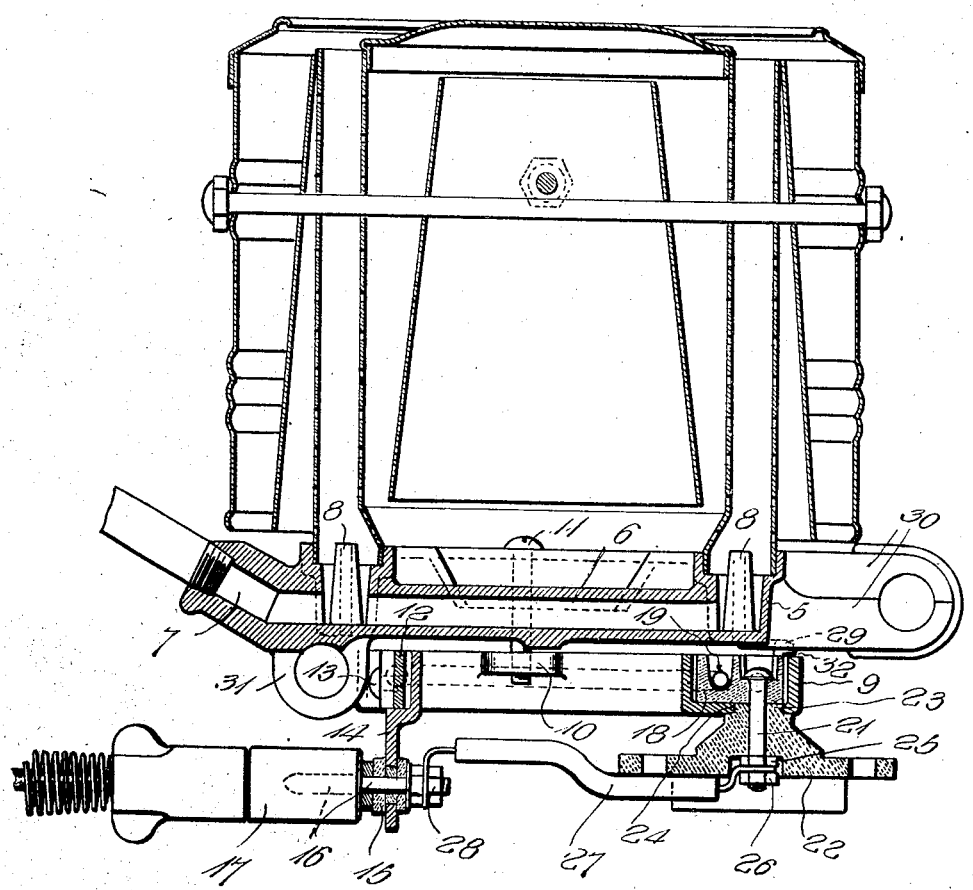
Fig. 1 is a vertical sectional view through a burner constructed in accordance with Patent No. 1,597,651, but improved in accordance with the present invention.

The general burner structure disclosed in Fig. 1, is practically identical with that illustrated in the patent above referred to, and hence will not be described in detail. It may be stated however that the numeral 5 designates a continuous fuel heating and vaporizing trough having diametrically opposite portions connected by a fuel pipe 6 and provided with a main fuel inlet 7. Attention may also be invited to the plurality of closely spaced, fuel-heating and air-admitting tubes 8 which rise from the bottom of the trough 5 and correspond to similar tubes shown in the patent upon which I am improving. When the trough 5 is sufficiently heated and the supply of fuel is admitted through the inlet 7, such fuel becomes vaporized and burns in the upper portion of the burner, producing an intensely hot blue flame. The gist of the present invention resides in the new and improved electrical means for initially heating the trough 5 to the required temperature for vaporizing the fuel.

The numeral 9 designates an auxiliary C-shaped trough which is mounted directly under the trough 5 and has its open top in close proximity to the bottom of said trough 5. In mounting the trough 9, I prefer to provide it with inwardly projecting lugs 10 which lugs are connected with the body of the burner, by appropriate screws or bolts 11. Extending horizontally between the ends of the trough 9 and integrally joined thereto, is a web 12, and secured by bolts or the like 13 to this web, is a vertical plate 14 which projects downwardly beyond the trough 9. Suitable insulators 15 are mounted in openings in this plate 14, and rigid terminals 16 pass through these insulators, the outer ends of the terminals being adapted for reception in suitable sockets in an insulating body 17, which sockets are electrically connected with current supply wires. In a manner to be described, the terminals 16 are connected with an electric heating element which functions to pre-heat the trough 5, and if the stove with which the invention is used, be provided with a plurality of burners, the body 17 may be engaged with the terminals 16 of any burner which is to be lighted.

A fire clay insulator 18 substantially fills the trough 9 and is channeled in its upper side to receive an electrical heating element 19. The ends of this element are connected with vertical bolts 21 which pass downwardly through an electrical insulator 22 at the lower side of the trough 9. One or the other of the insulators 18—22, is formed with portions 23 received in openings 24 in the bottom of the trough 9, said portions contacting with the other insulator and serving to insulate the bolts 21 from the trough 9. The lower ends of the bolts 21 are provided with nuts 25 which clamp the two insulators 18 and 22 in assembled relation with the trough 9, and said bolts are also provided with other nuts 26 which connect the rear ends of conductors 27 with said bolts, the front ends of these conductors being connected with the terminals 16, by nuts 28.

Portions of the heating element 19 are disposed substantially at the open lower ends of the tubes 8, so that heat from said element may rise through these tubes to effectively heat the latter while the heating element is in use to initially heat the trough 5, and due to the extremely close proximity of the bottom of this trough to the heating element 19, said trough will be intensely heated in a very short while, so that the fuel supply may be turned on and the burner lighted.

To check the escape of heat between the troughs 5 and 9, I provide the upper, outer corner of the insulator 18 with a rather thick flange 29 which lies upon the outer side wall of the trough 9, as seen in Figs. 1 and 4. This flange substantially closes the space between the outer side walls of the two troughs 5 and 9, and prevents the escape of any great amount of heat, so that such heat is confined beneath the trough 5, to attain quick and efficient results.

Certain arms 30 are shown projecting rearwardly from the burner body and a lug 31 is illustrated projecting downwardly from the front portion of said body, said arms and lug being instrumental in mounting the burner in a stove structure. The flange 29 is preferably notched as indicated at 32 to straddle one of the arms 30, and it will be observed that the lug 31 is located between the ends of the C-shaped trough 9. Preferably, the intermediate portions of the web 12 and the plate 14 are inwardly bowed to effectively clear this lug, as will be clear from Figs. 1, 2 and 3.

On account of existing advantages for the details disclosed, such details are preferably followed. However, within the scope of the invention as claimed, variations may be made.

I claim:

1. An electrical preheater for vapor burners, comprising a trough for disposition under a burner, a terminal support connected with and projecting rigidly downward from said trough, two relatively insulated terminals mounted on said support, electrical heating means within the trough, and conductors from said heating means to said terminals.

2. An electrical pre-heater for vapor burners, comprising a C-shaped trough for disposition under a burner, a web rigidly connecting the ends of said trough, two relatively insulated terminals supported by said web, electrical heating means within the trough, and conductors from said heating means to said conductors.

3. An electrical pre-heater for vapor burners, comprising a C-shaped trough for disposition under a burner, a web rigidly connecting the ends of said trough, a plate secured to and projecting downwardly from said web, two relatively insulated terminals carried by said plate, electrical heating means in the trough, and conductors from said terminals to said heating means.

4. An electrical pre-heater for vapor burners, comprising a C-shaped trough for disposition under a burner, a web rigidly connecting the ends of said trough, two relatively insulated terminals supported by said web, a fire clay insulator in the trough carrying a heating element, a second insulator under the portion of the trough remote from said web, one of said insulators having portions passing through an opening in the trough bottom and contacting with the other insulator, a pair of bolts passing through said insulators and said insulator portions and connected to the terminals of said heating element, and conductors connecting the lower ends of said bolts with the aforesaid terminals.

5. In a vapor burner having an annular fuel vaporizing trough, an auxiliary trough mounted directly under said vaporizing trough and having its open top in close proximity to the bottom of said vaporizing trough, and electrical heating means mounted in said auxiliary trough.

6. In a vapor burner having an annular fuel vaporizing trough and a plurality of closely spaced fuel heating and air inlet tubes rising from the bottom of said trough; an auxiliary trough mounted directly under the vaporizing trough and having its open top in close proximity to the bottom of said vaporizing trough and the aforesaid tubes, and an electrical heating element in the trough disposed substantially at the lower ends of said tubes.

7. In a vapor burner having an annular fuel vaporizing trough, an auxiliary trough mounted directly under said vaporizing trough and having its open top in close proximity to the bottom of said vaporizing trough, and a fire clay insulator substantially filling said auxiliary trough and provided with a heating element, the outer upper corner portion of said insulator having an outwardly projecting flange overlying the outer side wall of the auxiliary trough and serving to check escape of heat between the two troughs.

In testimony whereof I have hereunto affixed my signature.

GEORGE ALBERT HOFFMAN.